United States Patent [19]
Leboeuf

[11] Patent Number: 5,981,692
[45] Date of Patent: Nov. 9, 1999

[54] SEMI-CRYSTALLINE, SEMI-AROMATIC TERPOLYMERS WITH SUPERIOR POST-MOLDING SHRINKAGE AND BALANCE OF MECHANICAL PERFORMANCE

[75] Inventor: Christian Leboeuf, Kingston, Canada

[73] Assignee: Du Pont Canada Inc., Mississauga, Canada

[21] Appl. No.: 08/857,037

[22] Filed: May 15, 1997

[51] Int. Cl.$^6$ .......................... C08G 69/26; C08G 69/28; C08G 73/00

[52] U.S. Cl. .......................... 528/332; 528/310; 528/335; 528/336; 528/338; 528/339; 528/340; 528/347; 528/349; 524/600; 524/607

[58] Field of Search .......................... 528/310, 335, 528/336, 332, 338, 339, 340, 347, 349; 524/600, 407

[56] References Cited

U.S. PATENT DOCUMENTS

| | | | |
|---|---|---|---|
| Re. 34,337 | 8/1993 | Bennett | 141/95 |
| Re. 34,447 | 11/1993 | Poppe et al. | 524/606 |
| 5,098,940 | 3/1992 | Brooks | 524/227 |
| 5,183,843 | 2/1993 | Sakai et al. | 524/318 |
| 5,200,450 | 4/1993 | Blinne et al. | 524/356 |
| 5,256,718 | 10/1993 | Yamamoto et al. | 524/411 |
| 5,288,793 | 2/1994 | Chen | 524/606 |
| 5,306,754 | 4/1994 | Yamamoto et al. | 524/289 |
| 5,322,923 | 6/1994 | Lahary et al. | 528/349 |
| 5,324,766 | 6/1994 | Ikejiri et al. | 524/433 |
| 5,336,754 | 8/1994 | Lahary et al. | 528/349 |
| 5,378,800 | 1/1995 | Mok et al. | 528/338 |
| 5,422,420 | 6/1995 | Shridharani | 528/340 |
| 5,424,104 | 6/1995 | Amimoto et al. | 428/36.8 |
| 5,440,006 | 8/1995 | Lahary et al. | 528/349 |
| 5,516,882 | 5/1996 | Soelch | 528/349 |
| 5,656,717 | 8/1997 | Leboeuf | 528/349 |
| 5,750,639 | 5/1998 | Hayashi | 528/347 |

FOREIGN PATENT DOCUMENTS

| | | |
|---|---|---|
| 0368281 | 5/1990 | European Pat. Off. . |
| 382048 | 8/1990 | European Pat. Off. . |
| 413258 | 2/1991 | European Pat. Off. . |
| 0499466-A1 | 10/1991 | European Pat. Off. . |
| 395414-B | 3/1992 | European Pat. Off. . |
| 0489437-A2 | 6/1992 | European Pat. Off. . |
| 509282-A3 | 10/1992 | European Pat. Off. . |
| 532963-A3 | 3/1993 | European Pat. Off. . |
| 591731-A1 | 4/1994 | European Pat. Off. . |
| 519248 | 1/1996 | European Pat. Off. . |
| 522307-A | 6/1996 | European Pat. Off. . |

*Primary Examiner*—P. Hampton-Hightower
*Attorney, Agent, or Firm*—Kevin S. Dobson

[57] ABSTRACT

This invention relates to high temperature, semi-crystalline, semi-aromatic nylon terpolymers with improved shrinkage resistance, made from terephthalic acid (TA), hexamethylene diamine (HMD) and/or 2-methyl pentamethylene diamine (2-MPMD) and another aliphatic dicarboxylic acid as monomers. These polymers display superior % TD (Transverse Direction) annealing shrinkage, as well as very good balance of mechanical performance as high temperature nylons.

8 Claims, 4 Drawing Sheets

SEMI-CRYSTALLINE, SEMI-AROMATIC TERPOLYMERS WITH SUPERIOR POST-MOLDING SHRINKAGE AND BALANCE OF MECHANICAL PERFORMANCE

FIELD OF THE INVENTION

This invention relates to high temperature, semi-crystalline, semi-aromatic nylon terpolymers with improved shrinkage resistance, made from terephthalic acid (TA), hexamethylene diamine (HMD) and/or 2-methyl pentamethylene diamine (2-MPMD) and another aliphatic dicarboxylic acid as monomers. For many automotive or electrical/electronic applications, often rather complex parts are injection molded and dimensional stability of the moulded parts, under end-use conditions, becomes a critical attribute of performance. In these applications, post-molding performance or properties are strongly influenced by the level of crystallinity in a part and also by the level of residual stresses in the polymer's amorphous phase. This is especially true for electronic/electrical (E/E) connector applications, where the cross-section of parts is rather thin, where parts can be relatively long, and they are molded under water-tempered mould conditions (i.e. ≦100° C. mould surface temperature). For electronic connectors, component integrity and retention of pin position requires excellent dimensional stability under the high temperatures encountered during the soldering process.

BACKGROUND ART

Many terpolymers based on TA and HMD described in the patent literature or in commercial existence give very marginal performance in these applications. Such is the case for 6T/DT [50/50 molar ratio], the copolymer of hexamethylene terephthalamide (6T) and 2-methyl pentamethylene terephthalamide (DT) (U.S. Pat. No. 5,378,800 to Mok, Pagilagan; U.S. Pat. No. 5,322,923 to Lahary, Coquard) because of its high glass transition temperature (Tg) and high post-molding shrinkage. A terpolymer of hexamethylene terephthalamide/hexamethylene isophthalamide/hexamethylene adipamide (6T/6I/66) terpolymer [65/25/10 molar ratio], based on 3 acids, TA, isophthalic acid (IA) and adipic acid (AA), and HMD (U.S. Pat. No. Re. 34,447 to Poppe, Lisle, et al.) has high mold and post molding shrinkages when molded in cold molds. Similar would be the situation for the hexamethylene terephthalamide/hexamethylene isophthalamide/hexamethylene sebacamide (6T/6I/610) terpolymer [70/20/10 molar ratio] (U.S. Pat. No. 5,424, 104 to Amimoto et al.) because of its high Tg. Such would also be the case of the copolymer of hexamethylene terephthalamide/caprolactam (6T/6) [70/30] (EP 413258, to Kopietz, Betz, Blinne, Koch) because of its high $T_g$. Copolymers of hexamethylene terephthalamide/hexamethylene adipamide (6T/66), based on TA, AA and HMD, at 55/45 molar ratio (U.S. Pat. No. 5,424,104) or 65/35 molar ratio (U.S. Pat. No. Re. 34,447) are functional in these "cold mold" injection molded parts, and display acceptable post mold shrinkage, but suffer in melt processability (i.e. thermal stability and flow) and moisture adsorption.

Terpolymers containing TA and HMD are generically described in the patent literature. Typical of that prior art is U.S. Pat. No. 5,200,450 to Blinne, Goetz, Hurley, Gutsche, Muehlbach (BASF) wherein the semi-aromatic polyamide is composed of i) 20–90% (wt) of units derived from terephthalic acid and hexamethylene diamine, ii) 0–50% (wt) of units derived from ε-caprolactam, iii) 0–80% (wt) units derived from adipic acid and hexamethylene diamine, and iv) 0–40% (wt) of further polyamide-forming monomers. Also typical of that prior art is U.S. Pat. No. 5,324,766 to Ikejiri, Yamamoto, Kawamoto (Mitsui Petrochemicals Company), wherein the semi-aromatic polyamide resin consists essentially of i) a dicarboxylic acid component recurring unit consisting of 30–100 mole % of terephthalic acid component unit and 0–40 mole % of an aromatic dicarboxylic acid component unit other than terephthalic acid and/or 0–70 mole % on an aliphatic dicarboxylic acid component unit having an alkylene group of 4–20 carbon atoms and ii) a diamine component recurring unit comprising an alkylene diamine component unit having an alkylene group of 4 to 25 carbon atoms.

SUMMARY OF THE INVENTION

The prior art though fails to provide specific examples of terpolymers based on (1) TA and another aliphatic dicarboxylic acid, or an aliphatic amino-acid or lactam, as the 2 "acid" monomers, in conjunction with (2) HMD (Hexamethylene Diamine) and 2-MPMD (2-Methyl Pentamethylene Diamine) as the diamines. Furthermore, the prior art cited also fails to teach the molecular structure criteria by which to choose monomer combinations which deliver low $T_g$, good dimensional stability under end-use conditions while at the same time maintaining high temperature performance. In addition, none of the terpolymers in commercial existence are based on 2 diamines and 2 diacids, one being TA, the other, an aliphatic dicarboxylic acid, as briefly discussed above. The terpolymers of the invention are based on TA and another aliphatic dicarboxylic acid, with HMD, and optionally 2-MPMD as the diamines. These offer low post-molding shrinkage, good melt stability and processability, and low moisture adsorption.

A first embodiment of the semi-crystalline, semi-aromatic polyamide resin compositions of the invention comprise:
(1) terpolymer compositions with low TD (transverse direction) annealing shrinkage, especially when molded articles are formed in "cold molds" (i.e. mold surface temperature <100° C.).
(2) the terpolymers are composed of:
  i) Terephthalic acid and another aliphatic dicarboxylic acid of 10 carbon atoms (10C) or 12 carbon atoms (12C), and
  ii) Hexamethylene diamine and 2-methyl pentamethylene diamine,
    where TA is 55–80 mole % of the diacid monomers and the other aliphatic dicarboxylic acid of 10C or 12C: 45–20 mole % of the diacid monomers
    HMD: 75–100 mole % of the diamines
    2-MPMD: 25–0 mole % of the diamines
(3) furthermore, the terpolymers have Tg≦90° C., Tm≧295° C. and high % relative crystallinity, for good high temperature performance.

A second embodiment of the invention is:
(1) the terpolymer of the first embodiment and,
(2) optionally fillers and reinforcement
(3) optionally flame retardants
(4) optionally, toughening agents.
(5) optionally other additives such as antioxydants, stablizers, processing aids, flow improvers, etc

DESCRIPTION OF THE DRAWINGS

TD Annealing Shrinkage (%) as a function of mold temperature, for PA66 (Comparative Example 1), is shown in FIG. 1.

TD Annealing Shrinkage (%), as a function of mold temperature, for Comparative Example 1, (PA66), Comparative Example 2 (6T/DT 50/50 copolymer), Comparative Example 3 (6T/66 55/45 copolymer), Comparative Example 16 (6T/DT/66 terpolymer), Example F (6T/DT/612 55/10/35 terpolymer) and Example E (6T/DT/612 50/25/25 terpolymer), is shown in FIG. 2.

The correlation between polymer $T_g$ and its % Relative Crystallinity, as measured from pellets, for terpolymers with a melting point $\geq 295°$ C. is shown in FIG. 3.

The correlation between % Relative Crystallinity, measured from test bars, and the % Relative Crystallinity, measured from polymers pellets, is presented in FIG. 4.

DETAILED DESCRIPTION OF THE INVENTION

The present invention deals with our attempts to i) retain the good melt stability and low moisture adsorption of a copolymer like 6T/DT (50/50) and ii) to improve its crystallinity and/or its rate of crystallization beyond its intrinsic properties by replacing some of the terephthalic acid monomer with aliphatic dicarboxylic acids, while maintaining an acceptable balance of properties (e.g. mechanical performance, Tm, HDT, etc . . . ). One anticipated result of this partial replacement of TA with aliphatic dicarboxylic acids is a lowering of the Tg of 6T/DT (125° C. by DMA) to provide a full development of crystallinity and low post-molding shrinkage, even under "water tempered" mold conditions. For the development of new polymer compositions or new resin formulations, it is often impractical to resort to the evaluation of the functionality of the ultimate part (e.g. here an electronic connector) for screening purposes. Hence the great value of defining screening techniques based on a fundamental property response of these polymeric materials. We found that the most efficient way of assessing, and almost predicting, a polymer formulation's "fitness" under an electronic connector's end-use environment and conditions, was through the measurement of its % TD (transverse direction) annealing shrinkage.

This special technique was designed to quantify improvements made to the dimensional stability of different materials through polymer formulation changes. The key elements of that procedure are as follows.

The base polymers are compounded with 35% glass fiber, talc and (optionally) a heat stabilizer. The compounded materials are molded using a Nissei 185 Ton I/M (Injection Molding) machine. The mold is a tri-level or stepped plaque mold which is gated at one end. Proceeding in the flow direction from the gate, are 3 different areas of 3 different thicknesses. The thinnest section is the one farthest from the gate and the thickest section is nearest the gate. The width of the mold (and therefore of all 3 sections) is 4.125". Respectively, the 3 thicknesses are 0.025", 0.075" and 0.125". The mold surface temperature is controlled by a hot oil heat transfer system and can be varied at will. For each mold temperature, 5 plaques are used to measure the annealing shrinkage. After molding, the plaques are cut along the boundaries between the different thicknesses, at the steps. The dry-as-molded (DAM) width of the plaque is measured using dial calipers (to 0.0001") across it's middle, using marks to indicate where the measurement is made, each plaque having been individually labeled. The dimension transverse to polymer flow is chosen because of its more sensitive response to annealing conditions. Dimensional changes also occur in the flow direction, but they are much smaller because of the orientation of the glass fibers with flow.

The samples are then heated in an oven at 175° C. for 3 hours and cooled back to room temperature. They are then either measured right away or kept dry if not. The width of each plaque is re-measured, as before. Note: the plaques are pushed flat during measurement to eliminate any slight warpage effects. The difference between each set of width measurements, divided by the original width, ×100 gives the % TD Annealing Shrinkage for the plaque. These are averaged for the 5 plaques made under the same conditions. Constant molding conditions are used, except for the difference in mold temperature. Also, when different polymers are used, the barrel temperatures may be adjusted accordingly (e.g. lower melt temperatures used for Nylon 66 than for high temperature nylons.

Figure 1:
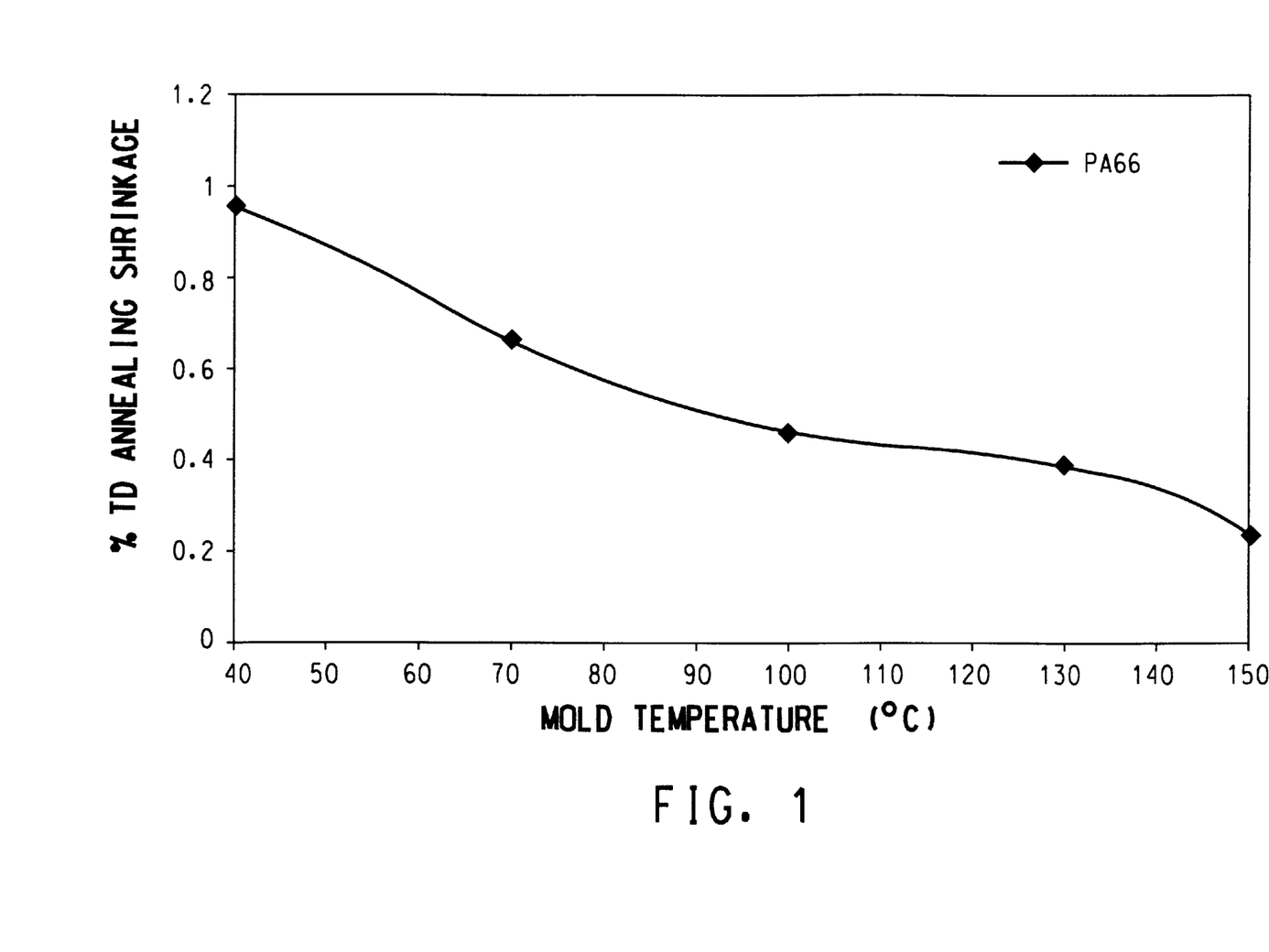

With the aid of this technique, it is straightforward to establish that there are 2 contributing factors to TD annealing shrinkage: one linked to "crystallinity" (i.e. dimensional changes taking place while full crystallization is achieved under annealing conditions), the other, and often a more significant factor in parts molded under "cold mold" conditions (i.e. mold surface temperature <100° C.) is the stress relaxation phenomenon taking place when the sample is annealed at a temperature above its Tg. For instance, for a semi-crystalline and fast crystallizing polymer like Nylon 66, TD annealing shrinkage is essentially all linked to "molded-in stresses" which are relaxed during the annealing process since, as evidenced by Differential Scanning Calorimetry (DSC), full potential crystallinity (i.e. no crystallization exotherm observed on the DSC scan) is achieved essentially at any mold temperature selected over a reasonable and practical range. The data for 35% Glass filled PA66 is shown in Table 1 below, and this effect of mold temperature is plotted in FIG. 1.

TABLE 1

| Comparative | | % TD Annealing Shrinkage MOLD TEMPERATURE (°C.) | | | | |
|---|---|---|---|---|---|---|
| Example | POLYMER | 40 | 70 | 100 | 130 | 150 |
| 1 | PA66 | 0.96 | 0.67 | 0.46 | 0.39 | 0.25 |

The DAM (Dry-as-molded) Tg of PA66 is very low (50° C.) and is very sensitive to moisture, which explains why this polymer is able to achieve its full potential crystallinity over a significant mold temperature range. For PA66, as for many other semi-crystalline polymers, dimensional changes due to crystallization represent only a fraction of the total shrinkage, especially for samples molded at low mold temperatures. Dimensional changes caused by stress relaxation become significantly more important, as molding temperature decreases (i.e. for lower mold surface temperatures).

Synthesis: Examples B–L and Comparative Examples 4–14

Several examples of synthesis of terpolymers, based on:
(1) TA and i) another aliphatic dicarboxylic acid of 6C, 10C or 12C or
  ii) the 6C caprolactam, and
(2) HMD and/or 2-MPMD as diamine(s), are reviewed in this section.

Synthesis was accomplished according to the process described here for Example F; recipes and process conditions for different candidate compositions are summarized in Table 2.

A 12 liter reaction vessel equipped with a helical ribbon agitator and a thermowell to measure reaction temperature, was charged with 1556 g (13.41 moles) of hexamethylene diamine as a 77.04% (wt) aqueous solution (2020 g of solution), 181 g (1.56 moles) 2-methyl pentamethylene diamine, 1584 g terephthalic acid (9.54 moles), 1182 g of dodecanedioic acid (5.14 moles), 3.94 g of a 25% aqueous solution of sodium hypophosphite, 7.88 g of a 1% water emulsion of Dow Corning B antifoam and 2000 g of demineralized water. With the reactor agitator rotating at 50 rpm, the mixture was heated to 130° C. and then vented for a brief period to remove entrained oxygen. Subsequently, the reaction mixture was heated to 214° C. (T2B in Table 2), at an autogenous pressure of 250 psig (P2A in Table 2). With the vessel pressure maintained at P2A of 250 psig, volatile matter was vented over a period of 51 minutes (t2A in Table 2) up to a melt temperature of 240° C. (T2A in Table 2). Then the reactor's PCV was closed and temperature was raised to approximately 250° C. and an autogenous pressure of 335 psig (P2B in Table 2). With the vessel pressure maintained at P2B of 335 psig, volatile matter was further vented over a period of 70 minutes (t2B in Table 2) until $T_{melt}$ reached a temperature of 300° C. (T3A in Table 2), at which point the 3rd polymerization cycle, pressure reduction, was initiated. Pressure in the reactor was then reduced from 335 psig to atmospheric pressure (P3A in Table 2) over a period of 61 minutes (t3A in Table 2), at which point the agitator rotational speed was reduced to 5 rpm, and vacuum was applied to the reaction vessel to finish polymerization. The melt temperature at the start of the vacuum cycle was 318° C. (T4 in Table 2), and a vacuum of −16" Hg (see Table 2) was applied for 15 minutes. The polymer obtained was at a final $T_{melt}$ of 320° C. (see Table 2) and was then discharged through a 2 hole die using $N_2$ pressure, over a period of 15 minutes (see t5 in Table 2), quenched in a water bath and pelletized.

The polymer obtained had an inherent viscosity (IV) of 0.90 dL/g; in these instances, inherent viscosity was measured on a 0.5 g/L solution in m-Cresol at 25° C. The polymer had a melting point of 297° C. (see Table 2) below, as measured by differential scanning calorimetry (DSC; ASTM D3418).

Recipes and process conditions for all examples presented in this patent are found in Table 2, and as appropriate, process cycle components are changed for their respective values in the "generic" example provided above. The process described above is an example of a 2-stage 2nd polymerization cycle (venting at constant pressure) and is the exception amongst our examples. In most instances, the 2nd polymerization cycle carries only a single stage.

Crystalline properties, determined from polymer pellets, as produced from the autoclave reactor described in Example 1, are summarized in Table 3. The terminology used in Table 3 is defined as follows:

$_{ex}T_{cc}$:

Temperature at which the "cold crystallization", as seen on the DSC (i.e. crystallization which occurs at temperatures below the melting point of the polymer, but usually above the $T_g$) takes place. For polymer compositions having high rates of crystallization, no $_{ex}T_{cc}$ is observed. These compositions are more likely to perform under "cold mold" conditions, provided their $T_g$ is sufficiently low.

DELTA $H_{cc}^{ex}$:

Heat of "cold crystallization", in J/g. It is used in the calculation of the PELLET CRYSTALLINE FRACTION (%).

$T_m^i$:

Melting point, initial melt curve.

TABLE 2

| EXAMPLE | PRODUCT | MONOMER RATIO | END CAP | Wt(g) | MOLAR % XS HMD | D | HMD mole | HMD wt(g) | 2-MPMD mole | 2-MPMD wt(g) | TA mole | TA wt(g) | OTHER ACID mole |
|---|---|---|---|---|---|---|---|---|---|---|---|---|---|
| 4 | 6T/DT/6 | 50/35/15 | BENZOIC | 10 | 2.0 | 6 | 8.89 | 1031 | 6.47 | 750 | 14.81 | 2459 | 2.65 |
| 5 | 6T/DT/6 | 50/40/10 | — | — | 2.0 | 6 | 8.63 | 1001 | 7.18 | 833 | 15.22 | 2527 | 1.69 |
| 6 | 6T/DT/6 | 55/15/30 | — | — | 1.0 | 6 | 10.62 | 1232 | 3.04 | 353 | 13.38 | 2221 | 5.73 |
| 7 | 6T/DT/6 | 55/15/30 | — | — | 2.0 | 9 | 6.88 | 798 | 1.99 | 231 | 8.59 | 1426 | 3.87 |
| 8 | 6T/DT/610 | 50/25/25 | ACETIC | 20 | 1.5 | 6 | 11.76 | 1364 | 4.09 | 475 | 11.58 | 1923 | 3.86 |
| 9 | 6T/DT/610 | 50/30/20 | ACETIC | 20 | 1.5 | 6 | 11.05 | 1282 | 4.95 | 574 | 12.45 | 2066 | 3.11 |
| 10 | 6T/DT/610 | 50/35/15 | ACETIC | 20 | 1.5 | 6 | 10.34 | 1199 | 5.82 | 675 | 13.32 | 2211 | 2.35 |
| 11 | 6T/DT/610 | 55/20/25 | ACETIC | 20 | 1.5 | 6 | 12.54 | 1455 | 3.28 | 380 | 11.59 | 1924 | 3.86 |
| 12 | 6T/DT/66 | 45/20/35 | BENZOIC | 25 | | 2 | 11.74 | 1362 | 2.99 | 347 | 9.53 | 1582 | 5.12 |
| 13 | 6T/DT/66 | 45/30/25 | — | — | 1.0 | 6 | 11.56 | 1341 | 5.20 | 603 | 12.26 | 2035 | 4.21 |
| 14 | 6T/DT/66 | 45/40/15 | — | — | 2.5 | 9 | 9.97 | 1157 | 7.03 | 816 | 13.78 | 2288 | 2.43 |
| 15 | 6T/DT/66 | 50/25/25 | — | — | 3.0 | 9 | 12.62 | 1464 | 4.46 | 517 | 12.26 | 2035 | 4.09 |
| 16 | 6T/DT/66 | 50/30/20 | — | — | 3.0 | 9 | 11.73 | 1361 | 5.32 | 617 | 13.02 | 2162 | 3.25 |
| 17 | 6T/DT/66 | 50/40/10 | — | — | 2.0 | 9 | 9.98 | 1158 | 7.04 | 817 | 14.53 | 2412 | 1.62 |
| A | 6T/DT/610 | 50/20/30 | ACETIC | 20 | 1.5 | 6 | 12.46 | 1445 | 3.25 | 377 | 10.74 | 1783 | 4.60 |
| B | 6T/DT/610 | 55/10/35 | ACETIC | 20 | 1.5 | 6 | 13.91 | 1614 | 1.61 | 187 | 9.90 | 1644 | 5.33 |
| C | 6T/DT/610 | 55/15/30 | BENZOIC | 30 | 2.0 | 7 | 13.30 | 1543 | 2.47 | 286 | 10.74 | 1783 | 4.59 |
| D | 6T/DT/612 | 50/10/40 | BENZOIC | 30 | 2.0 | 6 | 13.31 | 1544 | 1.53 | 178 | 8.70 | 1445 | 6.60 |
| E | 6T/DT/612 | 50/25/25 | ACETIC | 30 | 1.5 | 6 | 11.45 | 1328 | 3.98 | 462 | 11.28 | 1872 | 4.28 |
| F | 6T/DT/612 | 55/10/35 | ACETIC | 20 | 1.5 | 6 | 13.41 | 1556 | 0.16 | 18 | 9.54 | 1584 | 5.85 |
| G | 6T/DT/612 | 55/15/30 | BENZOIC | 40 | 2.0 | 9 | 11.44 | 1327 | 2.16 | 250 | 9.24 | 1534 | 4.50 |
| H | 6T/DT/612 | 55/20/25 | BENZOIC | 40 | 2.0 | 9 | 10.90 | 1264 | 2.91 | 338 | 10.02 | 1663 | 3.80 |

| EXAMPLE | PRODUCT | OTHER ACID wt(g) | H2O wt(g) | 25% SOL SHP wt(g) | 1% EMUL. DC-B(1) wt(g) | 1st CYCL. t1(min) | 2nd CYCLE STAGE 1 T2A(° C.) | HOLD "P" P2A(MPa) | TIME t2A(min) | STAGE 2 T2B(° C.) | HOLD "P" P2B(MPa) |
|---|---|---|---|---|---|---|---|---|---|---|---|
| 4 | 6T/DT/6 | 300 | 1200 | 3.94 | 19.70 | 59 | 219 | 2.07 | 56 | | |
| 5 | 6T/DT/6 | 191 | 1200 | 3.94 | 3.94 | 56 | 225 | 1.72 | 56 | | |

TABLE 2-continued

| EXAMPLE | PRODUCT | | | | | | | | | |
|---|---|---|---|---|---|---|---|---|---|---|
| 6 | 6T/DT/6 | 648 | 1200 | 3.94 | 3.94 | 62 | 228 | 1.72 | 54 | |
| 7 | 6T/DT/6 | 437 | 1500 | 3.94 | 17.50 | 57 | 229 | 2.21 | 61 | |
| 8 | 6T/DT/610 | 780 | 2000 | 3.94 | 7.88 | 74 | 228 | 2.31 | 147 | |
| 9 | 6T/DT/610 | 629 | 1200 | 3.94 | 7.88 | 69 | 232 | 2.21 | 101 | |
| 10 | 6T/DT/610 | 475 | 1200 | 3.94 | 3.94 | 74 | 236 | 2.21 | 90 | |
| 11 | 6T/DT/610 | 780 | 1200 | 3.94 | 7.88 | 64 | 232 | 2.21 | 73 | |
| 12 | 6T/DT/66 | 748 | 1200 | — | 35.00 | 65 | 221 | 1.72 | 39 | 240 2.21 |
| 13 | 6T/DT/66 | 615 | 2000 | 3.94 | 19.70 | 66 | 229 | 2.14 | 118 | |
| 14 | 6T/DT/66 | 355 | 1200 | 3.94 | 19.70 | 61 | 229 | 1.96 | 78 | |
| 15 | 6T/DT/66 | 597 | 1500 | 3.94 | 19.70 | 62 | 228 | 1.96 | 70 | |
| 16 | 6T/DT/66 | 475 | 1200 | 3.94 | 19.70 | 61 | 235 | 2.21 | 68 | |
| 17 | 6T/DT/66 | 236 | 1200 | 3.94 | 19.70 | 59 | 235 | 2.21 | 69 | |
| A | 6T/DT/610 | 930 | 1200 | 3.94 | 3.94 | 74 | 236 | 2.21 | 80 | |
| B | 6T/DT/610 | 1077 | 2000 | 3.94 | 7.88 | 62 | 228 | 2.31 | 118 | |
| C | 6T/DT/610 | 928 | 1200 | 3.94 | 19.70 | 59 | 231 | 2.21 | 65 | |
| D | 6T/DT/612 | 1334 | 1200 | 3.94 | 3.94 | 58 | 219 | 1.72 | 46 | |
| E | 6T/DT/612 | 865 | 2000 | 3.94 | 7.88 | 57 | 231 | 2.41 | 148 | |
| F | 6T/DT/612 | 1182 | 2000 | 3.94 | 7.88 | 55 | 214 | 1.7Z | 51 | 240 2.31 |
| G | 6T/DT/612 | 910 | 1500 | 3.94 | 17.50 | 58 | 230 | 2.31 | 117 | |
| H | 6T/DT/612 | 768 | 1200 | 3.94 | 17.50 | 40 | 233 | 2.21 | 58 | |

| EXAMPLE | PRODUCT | 2nd CYCLE TIME t2B (min) | 3rd CYCLE STAGE 1 T3A (° C.) | 3rd CYCLE REDUC. TO P3A (MPa) | 3rd CYCLE TIME t3A (min) | 4th CYCLE Tmelt T4 (° C.) | 4th CYCLE VACUUM (in Hg) | 4th CYCLE TIME t4 (min) | 5TH CYCLE CASTING t5 (min) | TOTAL RUN TIME(min) | FINAL Tmelt (° C.) |
|---|---|---|---|---|---|---|---|---|---|---|---|
| 4 | 6T/DT/6 | | 300 | 0 | 59 | 313 | −12 | 15 | 24 | 213 | 312 |
| 5 | 6T/DT/6 | | 275 | 0 | 45 | 320 | −10 | 6 | 21 | 184 | 320 |
| 6 | 6T/DT/6 | | 275 | 0 | 47 | 320 | −15 | 15 | 15 | 193 | 317 |
| 7 | 6T/DT/6 | | 300 | 0 | 57 | 319 | −10 | 15 | 26 | 216 | 318 |
| 8 | 6T/DT/610 | | 300 | 0 | 60 | 317 | −14 | 10 | 15 | 306 | 317 |
| 9 | 6T/DT/610 | | 300 | 0 | 60 | 318 | −10 | 5 | 14 | 249 | 318 |
| 10 | 6T/DT/610 | | 300 | 0 | 61 | 319 | −9 | 15 | 6 | 256 | 318 |
| 11 | 6T/DT/610 | | 300 | 0 | 58 | 320 | −9 | 15 | 15 | 215 | 320 |
| 12 | 6T/DT/66 | 100 | 300 | 0 | 38 | 310 | −15 | 9 | 20 | 271 | 313 |
| 13 | 6T/DT/66 | | 300 | 0 | 43 | 318 | −12 | 8 | 12 | 247 | 319 |
| 14 | 6T/DT/66 | | 300 | 0 | 44 | 318 | −15 | 10 | 16 | 209 | 317 |
| 15 | 6T/DT/66 | | 300 | 0 | 45 | 319 | −10 | 5 | 10 | 192 | 320 |
| 16 | 6T/DT/66 | | 300 | 0 | 44 | 321 | −5 | 5 | 14 | 192 | 321 |
| 17 | 6T/DT/66 | | 300 | 0 | 47 | 318 | −12 | 2 | 17 | 194 | 319 |
| A | 6T/DT/610 | | 300 | 0 | 57 | 326 | −14 | 15 | 18 | 244 | 317 |
| B | 6T/DT/610 | | 300 | 0 | 59 | 318 | −7 | 15 | 22 | 276 | 320 |
| C | 6T/DT/610 | | 300 | 0 | 53 | 317 | −9 | 15 | 25 | 217 | 319 |
| D | 6T/DT/612 | | 275 | 0 | 44 | 318 | −6 | 15 | 20 | 183 | 318 |
| E | 6T/DT/612 | | 300 | 0 | 58 | 317 | −4 | 15 | 17 | 295 | 319 |
| F | 6T/DT/612 | 70 | 300 | 0 | 61 | 318 | −16 | 15 | 0 | 213 | 320 |
| G | 6T/DT/612 | | 300 | 0 | 59 | 316 | −16 | 15 | 17 | 266 | 318 |
| H | 6T/DT/612 | | 300 | 0 | 59 | 320 | −7 | 15 | 17 | 209 | 320 |

| EXAMPLE | PRODUCT | Wt(g) CAST | Wt(g) OUT | YIELD CAST % | YIELD OUT % | BATCH SIZE (g) |
|---|---|---|---|---|---|---|
| 4 | 6T/DT/6 | 2646 | 3306 | 67 | 84 | 3940 |
| 5 | 6T/DT/6 | 2548 | 3199 | 65 | 81 | 3940 |
| 6 | 6T/DT/6 | 2236 | 2914 | 57 | 74 | 3940 |
| 7 | 6T/DT/6 | 1356 | 1661 | 39 | 47 | 3500 |
| 8 | 6T/DT/610 | 2667 | 3148 | 68 | 80 | 3940 |
| 9 | 6T/DT/610 | 2286 | 2904 | 58 | 74 | 3940 |
| 10 | 6T/DT/610 | 2978 | 3486 | 76 | 88 | 3940 |
| 11 | 6T/DT/610 | 2234 | 2618 | 57 | 66 | 3940 |
| 12 | 6T/DT/66 | 1410 | 2040 | 36 | 52 | 3940 |
| 13 | 6T/DT/66 | 2172 | 3392 | 55 | 86 | 3940 |
| 14 | 61/DT/66 | 2453 | 3323 | 62 | 84 | 3940 |
| 15 | 6T/DT/66 | 1900 | 2500 | 48 | 63 | 3940 |
| 16 | 6T/DT/66 | 1410 | 2600 | 36 | 66 | 3940 |
| 17 | 6T/DT/66 | 2113 | 2711 | 54 | 69 | 3940 |
| A | 6T/DT/610 | 2657 | 3141 | 67 | 80 | 3940 |
| B | 6T/DT/610 | 2500 | 3015 | 63 | 77 | 3940 |
| C | 6T/DT/610 | 2304 | 3114 | 58 | 79 | 3940 |
| D | 6T/DT/612 | 2710 | 3655 | 69 | 93 | 3940 |
| E | 6T/DT/612 | 2814 | 3434 | 71 | 87 | 3940 |
| F | 6T/DT/612 | 2488 | 3275 | 63 | 83 | 3940 |
| G | 6T/DT/612 | 1771 | 2406 | 51 | 69 | 3500 |
| H | 6T/DT/612 | 2593 | 3173 | 74 | 91 | 3500 |

PELLET CRYSTALLINE FRACTION (%):

The ratio of "net crystallinity" to "total crystallinity"×100, where:

"net crystallinity"=$\Delta H_m^i - \Delta 5\, H_{cc}^{ex}$

"total crystallinity"=$\Delta H_m^i$ $T_c^{pk}$:

Defined as the peak temperature at which crystallization occurs when a polymer composition is cooled from the melt. The $T_c^{pk}$ can be used as a measure of a positive improvement of crystalline properties when $T_c^{pk}$ is shifted to a higher temperature (i.e. the polymer starts to crystallize at a higher temperature, so it has higher probability of crystallizing fully before it reaches its $T_g$, below which temperature little happens in the amorphous phase).

DELTA $H_c$:

Heat of crystallization (J/g)

$T_m^r$:

Temperature of fusion (or melting point) from the remelt curve. Although not necessarily related to superior crystalline properties, the melting point, as measured by DSC during the remelt of the polymer, is important with respect to end-use performance. For certain E/E applications involving high temperature soldering, a high melting point is important It may translate into superior retention of pin placement.

TABLE 3

| | | 2nd CYCLE | | | | | | 3rd CYCLE | | |
|---|---|---|---|---|---|---|---|---|---|---|
| EXAMPLE | PRODUCT | STAGE 1 T2A (° C.) | HOLD "P" P2A (MPa) | TIME t2A (min) | STAGE 2 T2B (° C.) | HOLD "P" P2B (MPa) | TIME 2B (min) | TAGE 3A (° C.) | REDUC. TO P3A (MPa) | TIME t3A (min) |
| 4 | 6T/DT/6 | 219 | 2.07 | 56 | | | | 300 | 0 | 59 |
| 5 | 6T/DT/6 | 225 | 1.72 | 56 | | | | 275 | 0 | 45 |
| 6 | 6T/DT/6 | 228 | 1.72 | 54 | | | | 275 | 0 | 47 |
| 7 | 6T/DT/6 | 229 | 2.21 | 61 | | | | 300 | 0 | 57 |
| 8 | 6T/DT/610 | 228 | 2.21 | 147 | | | | 300 | 0 | 60 |
| 9 | 6T/DT/610 | 232 | 2.21 | 101 | | | | 300 | 0 | 60 |
| 10 | 6T/DT/610 | 236 | 2.21 | 90 | | | | 300 | 0 | 61 |
| 11 | 6T/DT/610 | 232 | 2.21 | 73 | | | | 300 | 0 | 58 |
| 12 | 6T/DT/66 | 221 | 1.72 | 39 | 240 | 2.21 | 100 | 300 | 0 | 38 |
| 13 | 6T/DT/66 | 229 | 2.14 | 118 | | | | 300 | 0 | 43 |
| 14 | 6T/DT/66 | 229 | 1.96 | 78 | | | | 300 | 0 | 44 |
| 15 | 6T/DT/66 | 228 | 1.96 | 70 | | | | 300 | 0 | 45 |
| 16 | 6T/DT/66 | 235 | 2.21 | 68 | | | | 300 | 0 | 44 |
| 17 | 6T/DT/66 | 235 | 2.21 | 69 | | | | 300 | 0 | 47 |
| A | 6T/DT/610 | 236 | 2.21 | 80 | | | | 300 | 0 | 57 |
| B | 6T/DT/610 | 228 | 2.31 | 118 | | | | 300 | 0 | 59 |
| C | 6T/DT/610 | 231 | 2.21 | 65 | | | | 300 | 0 | 53 |
| D | 6T/DT/612 | 219 | 1.72 | 46 | | | | 275 | 0 | 44 |
| E | 6T/DT/612 | 231 | 2.41 | 148 | | | | 300 | 0 | 58 |
| F | 6T/DT/612 | 214 | 1.72 | 51 | 240 | 2.31 | 70 | 300 | 0 | 61 |
| G | 6T/DT/612 | 230 | 2.31 | 117 | | | | 300 | 0 | 59 |
| H | 6T/DT/612 | 233 | 2.21 | 58 | | | | 300 | 0 | 59 |

| | 4th CYCLE | | | 5TH CYCL. | TOTAL | FINAL | | | | | |
|---|---|---|---|---|---|---|---|---|---|---|---|
| EXAMPLE | Tmelt T4 (° C.) | VACUUM (in Hg) | TIME t4 (min) | CASTING t5 (min) | RUN TIME(min) | Tmelt (° C.) | Wt(g) CAST | Wt(g) OUT | YIELD AST | YIELD OUT % | ATCH SIZE (g |
| 4 | 313 | −12 | 15 | 24 | 213 | 312 | 2646 | 3306 | 67 | 84 | 3940 |
| 5 | 320 | −10 | 6 | 21 | 184 | 320 | 2548 | 3199 | 65 | 81 | 3940 |
| 6 | 320 | −15 | 15 | 15 | 193 | 317 | 2236 | 2914 | 57 | 74 | 3940 |
| 7 | 319 | −10 | 15 | 26 | 216 | 318 | 1356 | 1661 | 39 | 47 | 3500 |
| 8 | 317 | −14 | 10 | 15 | 306 | 317 | 2667 | 3148 | 68 | 80 | 3940 |
| 9 | 318 | −10 | 5 | 14 | 249 | 318 | 2286 | 2904 | 58 | 74 | 3940 |
| 10 | 319 | −9 | 15 | 16 | 256 | 318 | 2978 | 3486 | 76 | 88 | 3940 |
| 11 | 320 | −9 | 5 | 15 | 215 | 320 | 2234 | 2618 | 57 | 66 | 3940 |
| 12 | 310 | −15 | 9 | 20 | 271 | 313 | 1410 | 2040 | 36 | 52 | 3940 |
| 13 | 318 | −12 | 8 | 12 | 247 | 319 | 2172 | 3392 | 55 | 86 | 3940 |
| 14 | 318 | −15 | 10 | 16 | 209 | 317 | 2453 | 3323 | 62 | 84 | 3940 |
| 15 | 319 | −10 | 5 | 10 | 192 | 320 | 1900 | 2500 | 48 | 63 | 3940 |
| 16 | 321 | −5 | 5 | 14 | 192 | 321 | 1410 | 2600 | 36 | 66 | 3940 |
| 17 | 318 | −12 | 2 | 17 | 194 | 319 | 2113 | 2711 | 54 | 69 | 3940 |
| A | 326 | −14 | 15 | 18 | 244 | 317 | 2657 | 3141 | 67 | 80 | 3940 |
| B | 318 | −7 | 15 | 22 | 276 | 320 | 2500 | 3015 | 63 | 77 | 3940 |
| C | 317 | −9 | 15 | 25 | 217 | 319 | 2304 | 3114 | 58 | 79 | 3940 |
| D | 318 | −6 | 15 | 20 | 183 | 318 | 2710 | 3655 | 69 | 93 | 3940 |
| E | 317 | −4 | 15 | 17 | 295 | 319 | 2814 | 3434 | 71 | 87 | 3940 |
| F | 318 | −16 | 15 | 0 | 213 | 320 | 2488 | 3275 | 63 | 83 | 3940 |
| G | 316 | −16 | 15 | 17 | 266 | 318 | 1771 | 2406 | 51 | 69 | 3500 |
| H | 320 | −7 | 15 | 17 | 209 | 320 | 2593 | 3173 | 74 | 91 | 3500 |

DELTA $H_m^r$:

Heat of fusion, from the remelt curve. The enthalpy of melting (heat of fusion) determined by DSC using the remelt curve, is a measure of the maximum level of crystallinity that can be achieved for a given monomer composition.

$T_g$:

Glass transition temperatures were obtained by DMA (Dynamic Mechanical Analysis) dry as molded (ASTM E1640)

General Molding of Test Samples from Neat Polymer: Examples A–H and Comparative Examples 3–17

The neat polymers were molded into test specimens using an Engel® I/M (Injection Molding) machine. The test samples were TYPE I tensile bars as specified in ASTM procedure D638, and ¼" and/or ⅛" flexural bars as specified in ASTM procedure D790. The test specimens were molded using a mold temperature of 100° C. For neat polymer test samples, an extruder barrel temperature of Tm+20° C. was used. Property measurements were made using the following ASTM procedures: Flexural Modulus D790; Tensile Strength—D638; Notched Izod Impact Strength—D256. Melting point and heat of fusion were determined under a nitrogen atmosphere using a differential scanning calorimeter (DuPont 912 DCDSC), at a rate of temperature rise of 10° C./minute, the temperature at the lowest point of the endothermic curve being deemed to be the melting point.

Glass transition temperature was determined by differential mechanical analysis (DMA)(ASTM El 640), at a rate of increase of 5° C./minute, operated under a nitrogen atmosphere. Storage Modulus is measured using the procedure ASTM D4065-82. Measurements are made of viscoelastic behavior using dynamic mechanical analysis, which provides information on an elastic component, known as the storage modulus, and on a viscous component, known as the loss modulus. Measurements made while the temperature is being changed lead to the information on the $T_g$ of the polymer; data on $T_g$ reported herein was obtained from a plot of storage modulus against temperature, $T_g$ being the temperature of significant decrease in storage modulus with increasing temperature.

For Examples A–H and Comparative Examples 3–17, mechanical properties of the neat terpolymer compositions were determined. Our results are summarized in Table 4. For ease of comparison and correlation with data in previous tables, the $T_g$ values are also shown in Table 4. The % Crystallinity column represents the level of crystallinity, as measured from these test samples, molded at 100° C. mold temperature. They are not to be mistaken with those from resin pellets, presented in Table 8.

TABLE 4

| | | | | TENSILE (MPa) | | | | FLEX. MOD. | | NOTC |
|---|---|---|---|---|---|---|---|---|---|---|
| | | | | DAM | | ANNEALED | | (MPa) | | Ft. |
| RUN # | EXAMPLE | PRODUCT | RATIO | MAX. STR. | % E | MAX. STR. | % E | DAM | ANNEAL. | DAM |
| 1003 | 3 | 6T/DT | 50/50 | 98.0 | 3.5 | | | 3082 | | |
| 1171 | 4 | 6T/DT/6 | 50/35/15 | 86.9 | 8.9 | 60.8 | 6 | 3008 | 3439 | 0.66 |
| 1103 | 5 | 6T/DT/6 | 50/40/10 | 82.7 | 8.7 | 47.9 | 4.7 | 3080 | 3356 | 0.75 |
| 1104 | 6 | 6T/DT/6 | 55/15/30 | 81.1 | 8.0 | 49.7 | 4.7 | 3104 | 3495 | 0.58 |
| 1133 | 7 | 6T/DT/6 | 55/15/30 | 76.4 | 10.0 | | | 3219 | | 0.77 |
| 1235 | 8 | 6T/DT/610 | 50/25/25 | 60.8 | 6.4 | 28.9 | 2.6 | 2835 | 3168 | 0.70 |
| 1236 | 9 | 6T/DT/610 | 50/30/20 | 90.3 | 10.4 | 32.7 | 3 | 2812 | 3153 | 0.53 |
| 1285 | 10 | 6T/DT/610 | 50/35/15 | 40.1 | 3.7 | | | 3006 | | 0.28 |
| 1230 | 11 | 6T/DT/610 | 55/20/25 | 96.9 | 14.2 | 42.0 | 3.9 | 2983 | 3136 | 0.60 |
| 960 | 12 | 6T/DT/66 | 45/20/35 | 47.2 | 1.3 | | | 3261 | | |
| 1050 | 13 | 6T/DT/66 | 45/30/25 | 60.4 | 1.8 | | | 3088 | | 0.61 |
| 992 | 14 | 6T/DT/66 | 45/40/15 | 75.8 | 2.3 | | | 3219 | | |
| 998 | 15 | 6T/DT/66 | 50/25/25 | 67.2 | 1.9 | | | 3357 | | |
| 995 | 16 | 6T/DT/66 | 50/30/20 | 55.1 | 1.5 | | | 3344 | | |
| 991 | 17 | 6T/DT/66 | 50/40/10 | 76.9 | 2.3 | | | 3192 | | |
| 1284 | A | 6T/DT/610 | 50/20/30 | 61.7 | 6.2 | | | 2849 | | 0.70 |
| 1229 | B | 6T/DT/610 | 55/10/35 | 96.0 | 24.0 | 33.4 | 3.1 | 2977 | 3111 | 0.96 |
| 1179 | C | 6T/DT/610 | 55/15/30 | 94.4 | 11.0 | 37.0 | 3.7 | 2908 | 3209 | 0.72 |
| 1167 | D | 6T/DT/612 | 50/10/40 | 78.2 | 7.4 | 26.1 | 2.4 | 3033 | 3091 | 0.48 |
| 1227 | E | 6T/DT/612 | 50/25/25 | 57.5 | 10.8 | 22.4 | 2.1 | 2803 | 3053 | 0.50 |
| 1218 | F | 6T/DT/612 | 55/10/35 | 85.1 | 12.2 | 27.1 | 2.5 | 2883 | 2938 | 0.64 |
| 1131 | G | 6T/DT/612 | 55/15/30 | 49.3 | 4.9 | 26.8 | 2.7 | 2943 | 3114 | 0.60 |
| 1169 | H | 6T/DT/612 | 55/20/25 | 66.7 | 7.3 | 29.1 | 2.8 | 2961 | 3133 | 0.61 |

| | | IZOD | DMA (E') | | HDT (° C.) | | DCS | | | |
|---|---|---|---|---|---|---|---|---|---|---|
| | | b/in. | Tg (° C.) | | 264PSI | | DAM | | ANNEALED | |
| EXAMPLE | PRODUCT | ANNEAL. | DAM | ANNEAL. | DAM | ANNEAL. | Tccex | % CRYST | Tccex | % CRYST |
| 3 | 6T/DT | | 123 | 126 | | | 174 | 81.9 | | |
| 4 | 6T/DT/6 | 0.39 | 102.1 | 94.2 | 134 | | 159.1 | 73.3 | | |
| 5 | 6T/DT/6 | 0.35 | 106.5 | 114.1 | 144 | | 166.3 | 73.7 | | |
| 6 | 6T/DT/6 | 0.4 | 89.5 | 79.7 | 118 | 127 | 142.4 | 86.2 | | |
| 7 | 6T/DT/6 | | 87 | | 119 | | | | | |
| 8 | 6T/DT/610 | 0.51 | 83 | 78.5 | 103 | | 133.9 | 84.7 | — | 0 |
| 9 | 6T/DT/610 | 0.66 | 88.9 | 89.8 | 103 | | 140.6 | 73.0 | — | 0 |
| 10 | 6T/DT/610 | | 92 | | | | 147.2 | 77.0 | | |
| 11 | 6T/DT/610 | 0.72 | 82.9 | 78.7 | 104 | 120 | 128.8 | 94.4 | | |

TABLE 4-continued

| 12 | 6T/DT/66 |  | 94 | 92 |  |  | 100.0 |  |  |
|----|----------|------|------|------|-----|-----|-------|---|---|
| 13 | 6T/DT/66 |  | 90 | 94 | 112 | 122 | 90.4 |  |  |
| 14 | 6T/DT/66 |  | 106 | 108 |  | 152 | 90.6 |  |  |
| 15 | 6T/DT/66 |  | 99 | 95 |  | 136 | 99.6 |  |  |
| 16 | 6T/DT/66 |  | 104 | 103 |  | 142 | 99.2 |  |  |
| 17 | 6T/DT/66 |  | 116 | 117 |  | 157 | 93.7 |  |  |
| A  | 6T/DT/610 |  | 77 |  |  | 127.7 | 82.0 |  |  |
| B  | 6T/DT/610 | 0.48 | 70.4 | 68.2 | 90 | 115.4 | 95.2 |  |  |
| C  | 6T/DT/610 | 0.44 | 75.8 | 74.6 | 106 | 113 | 124.1 | 95.5 |  |
| D  | 6T/DT/612 | 0.33 | 50.7 | 57.1 | 96 | — | 100.0 |  |  |
| B  | 6T/DT/612 | 0.33 | 75.2 | 70.4 | 108 | 134.4 | 86.0 | — | 0 |
| F  | 6T/DT/612 |  | 63.3 | 64.4 | 96 | — | 100.0 |  |  |
| G  | 6T/DT/612 |  | 66 | 64.2 | 100 | — | 100.0 |  |  |
| H  | 6T/DT/612 | 0.34 | 75 | 74.2 | 110 | 110 | 126.8 | 93.9 |  |

The obvious choice of aliphatic dicarboxylic acid monomer to use as partial replacement of TA to influence the performance of 6T/DT is AA, since AA is isomorphous with TA. Furthermore, an existing commercial polymer, a 6T/66 (55/45) copolymer (see our Comparative Example 2), is based on the 2 isomorphous acids, TA and AA, but only one diamine, HMD. The 6T/66 copolymer is functional in "cold mold" application and its $T_g$ is low (approx. 85° C., as measured by DMA on "dry-as-molded" parts. Thus, PA66 (polymer of Comparative Example 1), 6T/66 (55/45) (polymer of Comparative Example 2), 6T/DT (50/50) (polymer of Comparative Example 3) and terpolymers of Examples 16, F, E and B were compounded with 35% glass fiber, molded into test samples for determination of mechanical properties and into plaques for the measurement of % TD annealing shrinkage, according to the procedure described earlier on in this section.

General Compounding: Examples F,E,B and Comparative Examples 1–3

The glass filled polyamide samples were prepared as follows: the polyamide was blended in a V-shaped blender with a copper antioxidant, and talc (about 0.35%). The resultant blended mixture and silanated long glass fibers were fed through separate ports on a 20 mm Welding Engineers twin screw extruder that was operated at a temperature of 325° C., under vacuum. The resultant reinforced polyamide composition was passed through a stranding die and chopped into pellets. In one composition containing 54 parts of glass fiber per 100 parts of polyamide, the composition contained 4000 g of polyamide, 23 g of antioxidant, 23 g of talc and 2160 g of silanated long glass fibers.

General Molding of 35% GR Samples: Examples F, E,B and Comparative Examples 1–3

The glass reinforced compositions were molded into test specimens using an Engel® I/M machine. Plaques from the 3-step mold, required for the measurement of TD annealing shrinkage, were molded on a Nissei® 185 tons l/M machine. The test samples were TYPE I tensile bars as specified in ASTM procedure D638, and ¼" and/or ⅛" flexural bars as specified in ASTM procedure D790. The test specimens were molded using a mold temperature of 100° C., except for the 3-step plaques used to study the effect of mold temperature on TD annealing shrinkage which were molded at different mold temperatures, as specified for the needs of the study. For glass filled samples, an extruder barrel temperature of 325° C. is used. Measurements were made using the following ASTM procedures: Flexural Modulus D790; Tensile Strength D638. Melting point and heat of fusion were determined under a nitrogen atmosphere using a differential scanning calorimeter (DuPont 912 DCDSC), at a rate of temperature rise of 10° C./minute, the temperature at the lowest point of the endothermic curve being deemed to be the melting point ASTM D3418)

Glass transition temperature was determined by differential mechanical analysis (DMA, ASTM E 1640), at a rate of increase of 5° C./minute, operated under a nitrogen atmosphere. Storage Modulus is measured using the procedure ASTM D4065-82. Measurements are made of viscoelastic behavior using dynamic mechanical analysis, which provides information on an elastic component, known as the storage modulus, and on a viscous component, known as the loss modulus. Measurements made while the temperature is being changed lead to the information on the $T_g$ of the polymer; data on $T_g$ reported herein was obtained from a plot of storage modulus against temperature, Tg being the temperature of significant decrease in storage modulus with increasing temperature.

Figure 2:
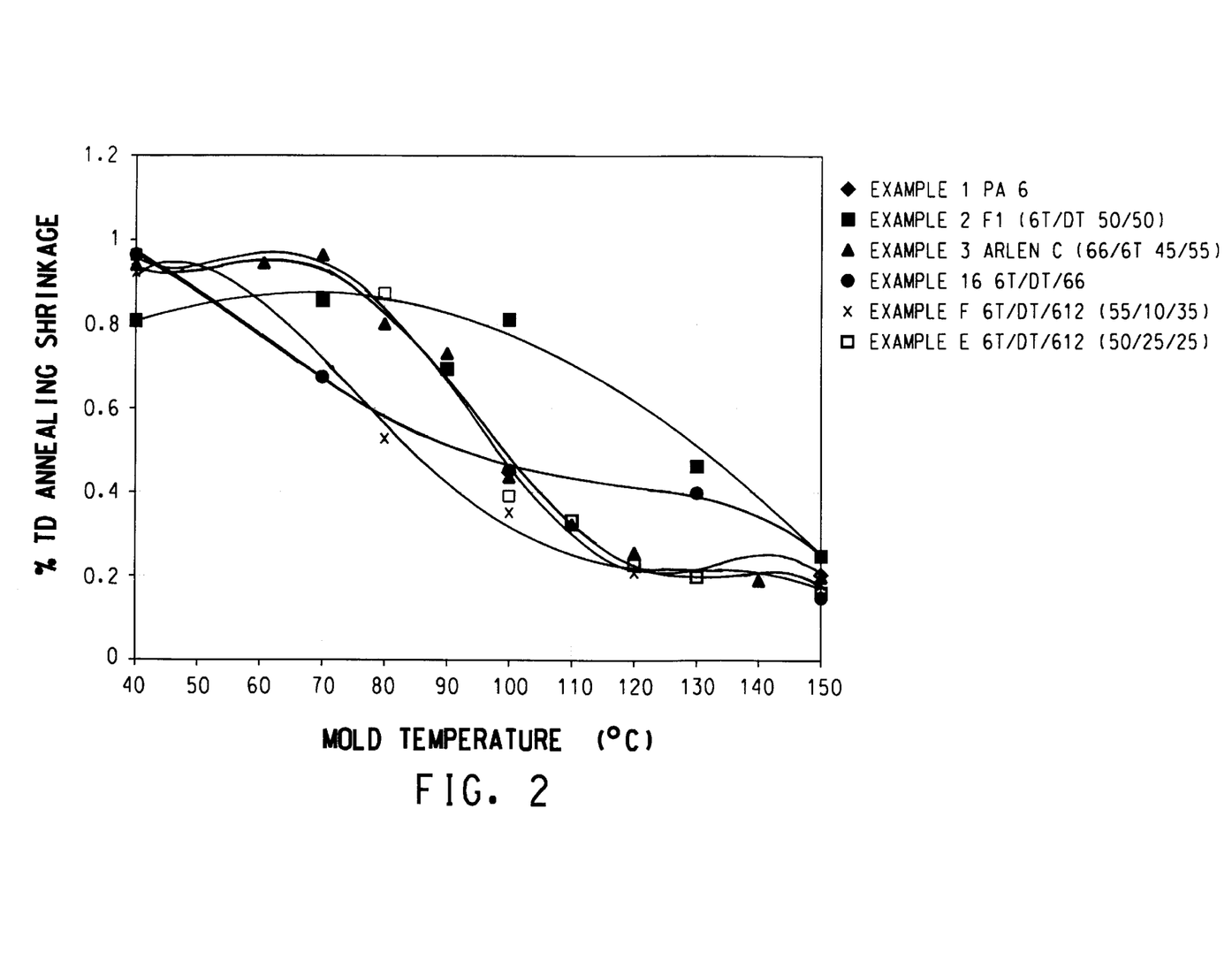

Results from the % TD annealing shrinkage determination and evaluation of the mechanical properties are summarized in Table 5. The mold temperature dependence of % TD annealing shrinkage is presented in Table 6, for Examples F, E, 1–3 and 16, and plotted in FIG. 2.

As one can see, the "obvious" candidates based on the partial replacement of TA with AA (Comparative Example 14) has a $T_g$ considerably above that of 6T/66, and as a result, its % TD annealing shrinkage is considerably higher. The obvious having failed, further reduction of $T_g$, while maintaining high temperature performance, was sought through terpolymers based on longer chain dicarboxylic acids. A few examples, for which % TD Annealing Shrinkage was measured at 35% Glass, are presented also in Table 5 (FIG. 2 for temperature dependency with mold temperature): F, a hexamethylene terephthalamide/2-mehtylpentamethylene terephthalamide/hexamethylene dodecanamide (6T/DT/612) at 55/10/35 molar ratio, where "12" stands for dodecanedioic acid, E the 6T/DT/612 terpolymer at 50/25/25 molar ratio and B, a hexamethylene terephthalamide/2-methyl pentamethylene terephthalamide/hexamethylene sebacamide (6T/DT/6 10) terpolymer at 55/10/35 molar ratio, where "10" designates sebacid acid (decanedioic acid). These examples demonstrate clearly that performance at least equal to the commercial polymer of Comparative Example 2, if not superior, can be achieved through polymer formulations, more specifically, as we have shown here, with terpolymers based on 2 diacids, TA and another aliphatic dicarboxylic acid, and 2 aliphatic diamines, HMD and 2-MPMD.

The F, E and B compositions offer an excellent balance of mechanical performance, high temperature capability, crystallinity potential developed as fully as, or even better than Comparative Example 2, and low % TD Annealing Shrinkage, as evidenced by the data presented in Table 5. It appears then that, in order to achieve an acceptably low shrinkage, and a high % relative crystallinity in the molded part (see data in Table 5), the $T_g$ of the terpolymer ought to be $\leq 90°$ C. The F to E variation, i.e. change in composition within the same series based on dodecanedioic acid, and the F to B variation, at constant molar ratio but in 2 different series, one based on the 12C diacid the other on the 10C, just begin to show the potential for establishing different composition maps which would define terpolymer compositions capable of achieving the performance balance claimed in this invention.

Lowering the $T_g$ even further through further increases of the molar % AA will not yield desirable results in the 6T/DT/66 series, from the point of view of reaching a good balance between annealing shrinkage, overall mechanical performance, melt stability and autoclave operability. On the basis of their $T_g$ alone, 6T/DT/66 terpolymers of Comparative Examples 12–17 (see Table 8), are not expected to yield the target post-molding shrinkage performance. Similarly, the candidates based on the incorporation of the 6C caprolactam as comonomer (see Comparative Examples 4–7 in Table 8) also fail to deliver acceptable performance, on the basis of their respective $T_g$.

Figure 3:
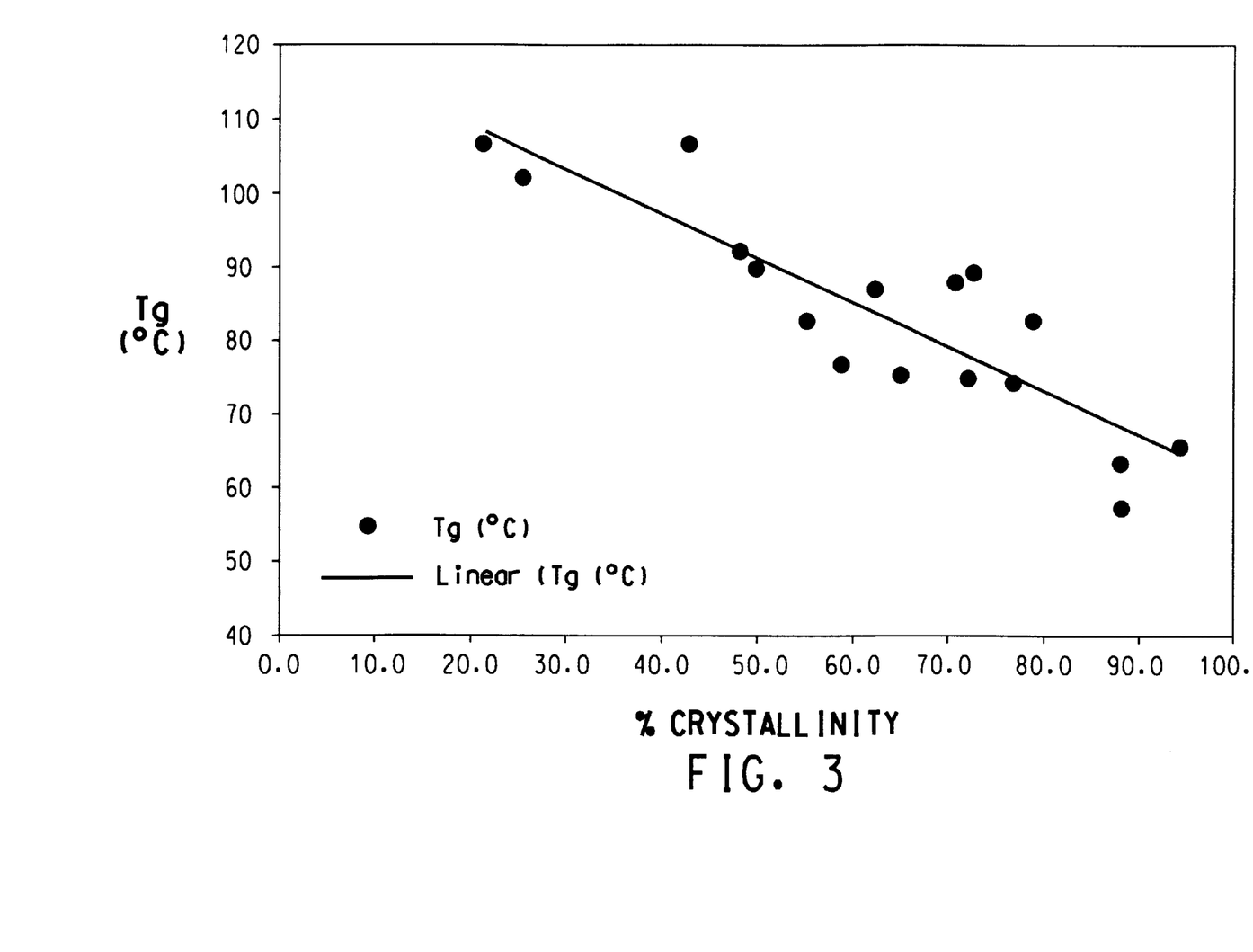

In describing the background of the invention above, we stated that not all terpolymer formulations meeting the composition criteria:

(1) as diacids, TA and another aliphatic dicarboxylic acid of 6C, 10C or 12C, and (2) HMD and/or 2-MPMD, as diamines, would meet the performance criteria, i.e. "high temperature characteristics" and low TD annealing shrinkage, even when molded in "cold molds" (mold surface temperature $\leq 100°$ C.). From the performance of the polymers of Comparative Example 2 and Examples F, E, B, all evaluated at 35% GR for TD annealing shrinkage, it appears preferable that the $T_g$ of the polymer be $\leq 90°$ C. From the data in Table 8, there is a good correlation between the level of crystallinity achieved in resin pellets (as they are produced from the autoclave, i.e. rapidly quenched in cold water) and polymer Tg, as can be seen from FIG. 3, for polymers having a $T_m \geq 295°$ C. (temperature limitation chosen for the "high temperature performance" criteria).

Figure 4:
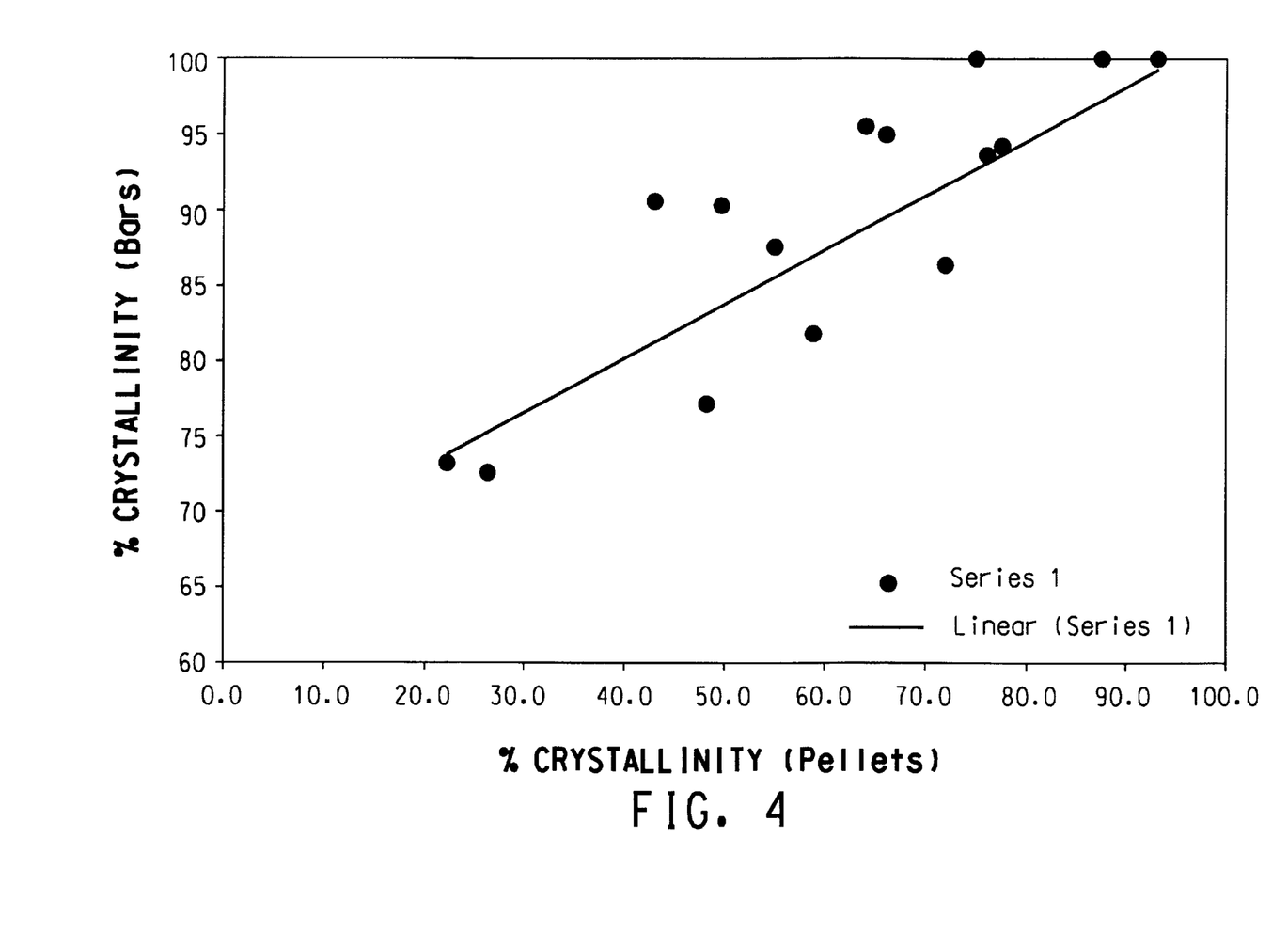

There is also a good correlation between the level of crystallinity measured from pellets, and that measured from molded test samples (100° C. mold temperature) (see FIG. 4). Thus, it is possible, based on data in Tables 3 and 4, to make a reasonably good selection of candidate formulations, likely to meet the TD annealing shrinkage. Those candidates are Examples A–H in our Tables.

TABLE 5

COMPARISON OF MECHANICAL PERFORMANCE OF VARIOUS HIGH TEMPERATURE NYLONS @ 35% GR

| EX. | POLYMER | MONOMER MOLAR RATIO | ASTM D-638 TENSILE STR(PSI) | ASTM D-638 ELONGATION % | ASTM D-790 FLEX. MOD.(Kpsi) | ASTM D-648 HDT(° C.) @ 264 psi | % TD ANNEALING SHRINKAGE 0.8 mm | 1.6 mm | 3.2 mm | E-793 CRYST. % | E-1640 DAM Tg(° C.) (DMA) |
|---|---|---|---|---|---|---|---|---|---|---|---|
| 1 | N66 | n/a | 28,400 | 10.3 | 1,420 | 254 | 0.47 | — | — | 100 | 61 |
| 2 | 6T/66 | 55/45 | 31,916 | 2.78 | 1,666 | 295 | 0.43 | 0.31 | 0.16 | 100 | 80 |
| 3 | 6T/DT | 50/50 | 33,377 | 2.8 | 1,666 | 263 | 0.87 | 0.53 | 0.43 | 43 | 125 |
| 16 | 6T/DT/66 | 50/30/20 | 28,200 | 2.3 | 1,500 | 273 | 0.81 | — | — | 92 | 98 |
| F | 6T/DT/612 | 55/10/35 | 31,377 | 2.74 | 1,614 | 266 | 0.35 | 0.26 | 0.17 | 100 | 70 |
| E | 6T/DT/612 | 50/25/25 | 30,819 | 2.58 | 1,617 | 276 | 0.39 | 0.28 | 0.20 | 100 | 73 |
| B | 6T/DT/610 | 55/10/35 | 30,506 | 2.57 | 1,656 | — | — | 0.21 | 0.12 | 100 | — |

TABLE 6

| EXAMPLE | POLYMER | MONOMER RATIO | % TD ANNEALING SHRINKAGE MOULD TEMPERATURE (° C.) | | | | | | | |
|---|---|---|---|---|---|---|---|---|---|---|
| | | | 40 | 70 | 80 | 100 | 120 | 130 | 140 | 150 |
| 1 | N66 | n/a | 0.96 | 0.67 | — | 0.46 | — | 0.39 | — | 0.25 |
| 2 | 6T/66 | 55/45 | 0.93 | 0.94 | — | 0.43 | — | — | — | 0.18 |
| 3 | 6T/DT | 50/50 | 0.81 | 0.85 | — | 0.81 | 0.62 | 0.46 | 0.42 | 0.25 |
| 16 | 6T/DT/66 | 50/30/20 | — | — | — | 0.81 | — | — | — | 0.15 |
| F | 6T/DT/612 | 55/10/35 | 0.92 | — | 0.52 | 0.35 | 0.21 | — | — | — |
| E | 6T/DT/612 | 50/25/25 | 0.96 | — | 0.86 | 0.39 | — | — | — | — |

| GLOSSARY OF ABBREVIATIONS | |
|---|---|
| 66 | hexamethylene adipamide |
| 610 | hexamethylene sebacamide |
| 612 | hexamethylene dodecanamide |
| 6I | hexamehtylene isophthalamide |
| 6T | hexamehtylene terephthalamide |
| 6T/6 | hexamethylene terephthalamide/polycaprolactam |
| ASTM | American Standard Testing Method |
| D | 2-methyl pentamethylene diamine |
| DAM | "dry-as-molded" |
| DMA | dynamic mechanical analysis |
| DSC | differential scanning calorimetry |
| DT | 2-methyl pentamethylene terephthalamide |
| E/E | electronic/electrical |
| HDT | heat deflection temperature |
| HMD | hexamethylene diamine |
| IA | isophthalic acid |
| I/M | injection molding |
| IR | infrared |
| IV | inherent viscosity |
| LCP | Liquid Crystal Polymer |
| 2-MPMD | 2-methyl pentamethylene diamine |
| Nylon 46 | polytetramethylene adipamide |
| PA66 | polyhexamethylene adipamide |
| PCV | pressure control valve |
| PPS | polyphenylene sulfide |
| TA | terephthalic acid |
| TD | transverse direction |
| $T_g$ | glass transition temperature |
| $T_m$ | melting temperature |
| $T_{melt}$ | temperature of the polymer melt in the reactor |

I claim:

1. A polyamide composition comprising a semi-crystlline, semi-aromatic terpolymer composed of
    (i) diacid monomers comprising from 55 to 80 mole % of terephalic acid based on the diacid monomers and from 45 to 20 mole % based on the diacid monomers of at least one other aliphatic acid having 10 or 12 carbon atoms; and
    (ii) diamines comprising from 50 to 95 mole % based on the diamines of hexamethylene diamine and from 50 to 5 mole % of the diamines of 2-methyl pentamethylene diamine;
wherein the polymer has a Tg of less than or equal to 90° C. and a Tm of at least 295° C.

2. The polyamide composition of claim 1 in which terephthalic acid is present in amounts in the range of 60–80 mole % of the diacid monomers and said other aliphatic acid is present in the range of 40–20 mole % of the diacid monomers, hexamethylene diamine is present in the range of 70–95 mole % of the diamines, and 2-methyl pentamethylene diamine is in the range of 30–5 mole % of the diamines, and the polymer has a $T_g$ of less than or equal to 85° C. and a $T_m$ of at least 295° C.

3. The polyamide composition of claim 1 in which terephthalic acid is present in amounts in the range of 65–80 mole % of the diacid monomers and said other aliphatic acid is present in the range of 35–20 mole % of the diacid monomers, hexamethylene diamine is present in the range of 70–90 mole % of the diamines, and 2-methyl pentamethylene diamine is in the range of 30–10 mole % of the diamines, and the polymer has a $T_g$ of less than or equal to 80° C. and a $T_m$ of at least 295° C.

4. The polyamide composition of claim 1 also containing filler.

5. The polyamide composition of claim 1 also containing reinforcing materials.

6. The polyamide composition of claim 1 also containing flame retardant.

7. The polyamide composition of claim 1 also containing toughening agent.

8. The polyamide composition of claim 1 also containing at least one additive selected from antioxidants, stabilizers, processing aids, and flow improvers.

* * * * *